United States Patent
Abe

(10) Patent No.: US 11,503,245 B2
(45) Date of Patent: Nov. 15, 2022

(54) IMAGING DEVICE

(71) Applicant: Panasonic Intellectual Property Management Co., Ltd., Osaka (JP)

(72) Inventor: Mitsuo Abe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 139 days.

(21) Appl. No.: 16/925,692

(22) Filed: Jul. 10, 2020

(65) Prior Publication Data

US 2021/0067734 A1    Mar. 4, 2021

(30) Foreign Application Priority Data

Sep. 3, 2019  (JP) .............................. JP2019-160525

(51) Int. Cl.
| | |
|---|---|
| *H04N 5/76* | (2006.01) |
| *H04N 5/921* | (2006.01) |
| *H04N 5/77* | (2006.01) |
| *H04N 5/232* | (2006.01) |

(52) U.S. Cl.
CPC ....... *H04N 5/921* (2013.01); *H04N 5/232939* (2018.08); *H04N 5/772* (2013.01)

(58) Field of Classification Search
USPC .................................................. 348/231.99
See application file for complete search history.

(56) References Cited

U.S. PATENT DOCUMENTS

| | | | | |
|---|---|---|---|---|
| 6,038,368 A | * | 3/2000 | Boetje | H04N 5/765 386/314 |
| 6,701,058 B1 | * | 3/2004 | Tsubaki | H04N 1/00891 386/277 |
| 8,655,140 B2 | * | 2/2014 | Matoba | G11B 27/329 386/232 |
| 10,313,279 B2 | * | 6/2019 | DeMattei | G06Q 10/107 |
| 2002/0063781 A1 | * | 5/2002 | Aizawa | H04N 5/772 348/E5.042 |
| 2005/0117877 A1 | * | 6/2005 | Kobayashi | G11B 15/1875 369/84 |
| 2005/0134689 A1 | * | 6/2005 | Hatanaka | H04N 5/232939 348/207.1 |
| 2006/0233516 A1 | * | 10/2006 | Kimura | H04N 5/91 |
| 2006/0294321 A1 | * | 12/2006 | Mehta | G06F 15/8007 711/147 |
| 2007/0019016 A1 | * | 1/2007 | Silverbrook | G06K 15/102 347/13 |

(Continued)

FOREIGN PATENT DOCUMENTS

| | | |
|---|---|---|
| JP | 1999-146328 A | 5/1999 |
| JP | 2006-287277 A | 10/2006 |
| JP | 2009-032331 A | 2/2009 |

*Primary Examiner* — Nigar Chowdhury
(74) *Attorney, Agent, or Firm* — Renner, Otto, Boisselle & Sklar, LLP

(57) ABSTRACT

The controller of a digital camera executes copying of image data between memory cards loaded in the digital camera. The controller stores target medium information in a memory. The target medium information indicates, among the loaded memory cards, a memory card in which image data is recorded last or a memory card from which image data is read last. Based on the target medium information, the controller sets a copy direction. The copy direction indicates, among the loaded memory cards, a copy source memory card and a copy destination memory card.

9 Claims, 12 Drawing Sheets

(56) References Cited

U.S. PATENT DOCUMENTS

| | | | | |
|---|---|---|---|---|
| 2007/0083491 A1* | 4/2007 | Walmsley | | G06F 21/608 |
| 2007/0126879 A1* | 6/2007 | Maeda | | G11B 27/034 |
| | | | | 348/207.99 |
| 2007/0150891 A1* | 6/2007 | Shapiro | | G06F 16/164 |
| | | | | 717/174 |
| 2007/0292104 A1* | 12/2007 | Katano | | H04N 5/772 |
| | | | | 386/277 |
| 2008/0025708 A1* | 1/2008 | Ono | | G11B 27/034 |
| | | | | 386/E5.001 |
| 2008/0281874 A1* | 11/2008 | Koga | | G06F 16/113 |
| 2009/0028513 A1* | 1/2009 | Nosaka | | G11B 20/10 |
| | | | | 386/237 |
| 2009/0198740 A1* | 8/2009 | Braun | | H04L 65/4015 |
| 2010/0008649 A1* | 1/2010 | Watanabe | | G11B 27/034 |
| | | | | 386/341 |
| 2010/0110227 A1* | 5/2010 | Shimizu | | H04N 5/772 |
| | | | | 348/231.1 |
| 2011/0010301 A1* | 1/2011 | Tsuruga | | H04N 5/913 |
| | | | | 705/310 |
| 2011/0234837 A1* | 9/2011 | Yokoyama | | G11B 27/36 |
| | | | | 348/222.1 |
| 2012/0098969 A1* | 4/2012 | Wengrovitz | | H04N 7/181 |
| | | | | 348/E7.085 |
| 2012/0128331 A1* | 5/2012 | Tsuruga | | G11B 20/00456 |
| | | | | 386/E9.011 |
| 2013/0250326 A1* | 9/2013 | Kono | | H04N 1/00228 |
| | | | | 358/1.13 |
| 2014/0085506 A1* | 3/2014 | Azami | | G11B 27/322 |
| | | | | 348/231.5 |
| 2014/0354851 A1* | 12/2014 | Yasuoka | | G06F 16/11 |
| | | | | 348/231.99 |
| 2017/0013200 A1* | 1/2017 | Shirakawa | | H04N 5/23216 |

* cited by examiner

| Items | Information |
|---|---|
| Recording mode | Relay recording |
| Recording destination slot | 1→2 |
| JPEG recording destination | 1 |
| RAW recording destination | 1 |
| Moving image recording destination | 2 |

FIG. 12A

| Items | Information |
|---|---|
| Current slot number | 1 |
| Current folder number | 101 |
| Current file number | 007 |

FIG. 12B

IMAGING DEVICE

CROSS-REFERENCE TO RELATED APPLICATION

This application claims priority to Japanese Patent Application No. 2019-160525, filed on Sep. 3, 2019. The contents of that application are incorporated by reference herein in their entirety.

TECHNICAL FIELD

The present disclosure relates to an imaging device. Particularly, it relates to an imaging device capable of recording image data captured by the imaging device on multiple recording media and copying the image data between the recording media.

BACKGROUND ART

There is known an imaging device having multiple card slots for setting multiple recording media (memory cards or the like) therein as disclosed in, for example, Japanese Patent Application Laid-Open No. H11 (1999)-146328.

There is a need to copy image data between multiple recording media in an imaging device. For example, image data may be copied from one recording medium to another recording medium for the purpose of backing up the image data, changing where to save the image data, or the like. An imaging device therefore sets a copy direction between the multiple recording media. The copy direction is a direction from which recording medium to which recording medium image data is to be copied.

An imaging device can often have only a limited user interface such as a display monitor and an operation unit. If the copy direction between multiple recording media is fixedly set, a user needs to check and change the copy direction every time image data is copied between the multiple recording media. Therefore, there was a problem that the operation for copying image data between recording media tends to be cumbersome.

BRIEF SUMMARY

The present disclosure provides an imaging device in which a user operation for copying or transferring image data between multiple recording media can be easily and smoothly performed.

The imaging device according to one aspect of the present disclosure comprises an imaging unit, a medium connection unit, a display unit, a controller, and a memory. The imaging unit is configured to capture an image of a subject and generate image data. The medium connection unit is connectable to multiple recording media for recording the image data. The display unit is configured to display an image based on the image data. The controller is configured to execute at least one of copying and transferring of the image data between the multiple recording media. The controller is configured to store target medium information in the memory. The target medium information indicates, among the multiple recording media, a recording medium in which the image data is recorded last or a recording medium from which the image data is read last. The controller unit is configured to set a copy direction based on the target medium information. The copy direction indicates, among the multiple recording media, a copy source recording medium and a copy destination recording medium for copying the image data. The controller unit is configured to set a transfer direction based on the target medium information. The transfer direction indicates, among the multiple recording media, a transfer source recording medium and a transfer destination recording medium for transferring the image data.

In the imaging device according to another aspect of the present disclosure, the controller is configured to set a recording medium for editing the image data based on the target medium information, from among the multiple recording media. The controller is configured to set a recording medium for deleting the image data based on the target medium information, from among the multiple recording media.

According to the present disclosure, the imaging device is effective in achieving an easy and smooth user operation for copying or transferring image data between multiple recording media.

BRIEF DESCRIPTION OF DRAWINGS

FIG. 12A shows an example of a reference table to be updated by the digital camera; and FIG. 12B shows an example of a reference table to be updated by the digital camera.

DESCRIPTION

Hereinafter, embodiments will be described in detail with reference to the drawings as appropriate. Any description deemed unnecessary may be omitted. For example, detailed description of well-known aspects or duplicate description of substantially identical components may be omitted. This is to avoid unnecessary redundant description in the following and to facilitate understanding by those skilled in the art. The inventor provides the accompanying drawings and the following description in order for those skilled in the art to fully understand the present disclosure, which are not intended to limit the subject matter as recited in the claims.

In the present disclosure, the term "recording medium" is not limited to a recording medium in a state of being detached (or disconnected) from an imaging device. The term can have a meaning of a recording medium in a state of being loaded in or connected to an imaging device. For example, in a case where the recording media are memory cards 201 and 202 (FIG. 1) as will be described later and are loaded in the card slots 1 and 2 respectively, to specify the card slots 1 and 2 can include a meaning of specifying the loaded memory cards 201, 202.

1. Embodiment 1

Hereinafter, the imaging device according to Embodiment 1 will be described with reference to the drawings.

1-1. Configuration

Figure 1:
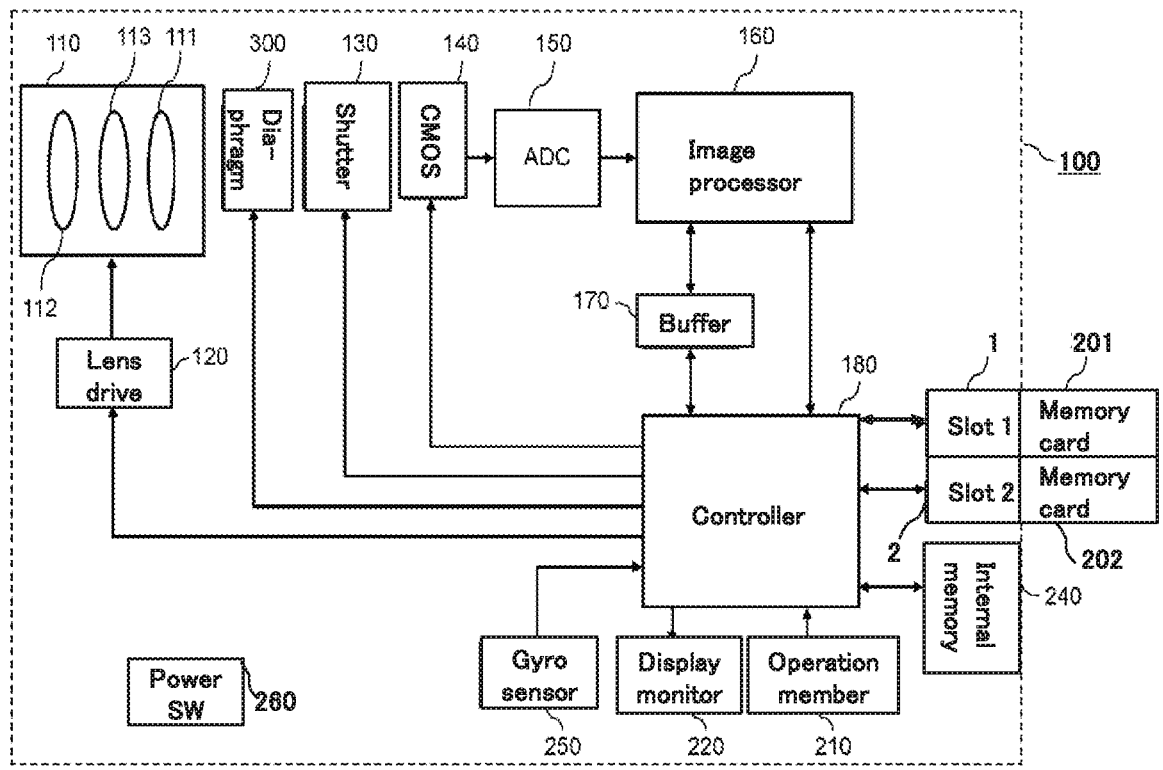
FIG. 1 shows an overall configuration of a digital camera according to Embodiment 1.

FIG. 1 shows a configuration of the digital camera 100 (an example of an imaging device) according to Embodiment 1. The digital camera 100 forms a subject image through the optical system 110 having one or more lenses, and captures the subject image by the CMOS (Complementary MOS) 140 that exemplifies an imaging unit. The image data generated by the CMOS 140 is subjected to various processes by the image processor 160 and stored in the memory cards 201 and 202. Hereinafter, the configuration of the digital camera 100 will be described in detail.

The optical system 110 includes a focus lens 111, a zoom lens 112, and an image stabilizing lens 113. By moving along the optical axis, the zoom lens 112 can enlarge or reduce the subject image. By moving along the optical axis, the focus lens 111 can adjust a focus on the subject image to be in focus. The image stabilizing lens 113 corrects blurring of the subject image due to shaking of the digital camera 100.

The lens drive 120 drives the lenses (for example, the zoom lens 112 and the focus lens 111) in the optical system 110. The lens drive 120 includes, for example, a zoom motor for driving the zoom lens 112 and a focus motor for driving the focus lens 111.

The diaphragm 300 adjusts a size of the aperture automatically or by a user's manual setting, thereby adjusting the amount of light transmitted through the aperture.

The shutter 130 blocks the light transmitted through the CMOS 140. The shutter 130, as well as with the optical system 110 and the diaphragm 300, deal with optical information indicating a subject image. The optical system 110 and the diaphragm 300 are housed in a lens barrel.

The CMOS 140 (an example of an imaging unit) captures a subject image formed by the optical system 110 to generate image data. The CMOS 140 includes a color filter, a light receiving element, and an AGC (Auto Gain Controller). The light receiving element converts light collected by the optical system 110 into an electric signal to generate image data. The AGC amplifies the electric signal output from the light receiving element. The imaging unit may not be a CMOS but may be another imaging element such as a CCD (Charge Coupled Device) image sensor or an NMOS image sensor.

The ADC (A/D converter: analog-digital converter) 150 converts analog image data generated by the CMOS 140 into digital image data.

The image processor 160 performs various processes for the converted digital image data under control of the controller 180. The image processor 160 generates image data to be displayed on the display monitor 220, and stores the image data in the memory cards 201 and 202, and so on. For example, the image processor 160 performs various processes such as a gamma correction, a white balance correction, and a flaw correction on the image data generated by the CMOS 140. The image processor 160 converts the image data generated by the CMOS 140 into a compression format that complies with the H.264 standards or the MPEG2 standards.

The controller 180 (an example of a controller) controls the entire digital camera 100. The controller 180 can be a semiconductor device or the like. The image processor 160 and the controller 180 can be configured only by dedicated electronic circuitry or hardware designed to perform predetermined functions, or may be configured by a combination of hardware and software . . . . The controller 180 may be configured by, for example, a microcomputer, a CPU (Central Processing Unit), an MPU (Micro Processing Unit), a DSP (Digital Signal Processor), an ASIC (Application Specific Integrated Circuit), or an FPGA (Field Programmable Gate Array).

The buffer 170 serves as a work memory for the image processor 160 and the controller 180. The buffer 170 is configured by, for example, a DRAM (Dynamic Random Access Memory), a ferroelectric memory, or the like.

The card slots 1 and 2 (an example of a medium connection unit) are means for loading the memory cards 201 and 202 in the digital camera 100. The card slots 1 and 2 mechanically and electrically connect the memory cards 201 and 202 to the digital camera 100. As will be described later, the digital camera 100 records the card slot 1 as "slot 1" and the card slot 2 as "slot 2".

The memory cards 201 and 202 (an example of the first and second recording media or the first and second memory devices) each include a flash memory or a ferroelectric memory inside. The memory cards 201 and 202 store image files generated by the image processor 160 and other such data.

The internal memory 240 (an example of a memory) may be configured by a flash memory, a ferroelectric memory, or the like. The internal memory 240 stores control programs and data for controlling the digital camera 100 as a whole. The internal memory 240 stores a reference table (FIGS. 12A and 12B) as will be described later.

The operation member 210 (an example of an operation unit) is a generic term for a user interface that receives a user operation. The operation member 210 includes at least one of a button, a lever, a dial, a touch panel, a switch, etc. for receiving a user operation. The operation member 210 also includes a focus ring disposed on an outer circumference of the lens barrel. The focus ring is a member that is rotated by a user to move the focus lens 111.

The display monitor 220 is capable of displaying an image (live view image) based on the image data generated by the CMOS 140 and an image based on the image data read from the memory cards 201 and 202. The display monitor 220 is also capable of displaying various menu screens for performing various settings for the digital camera 100. The display monitor 220 is configured by a liquid crystal display device or an organic EL (Electro Luminescence) display device.

The gyro sensor 250 is a sensor that detects shaking (movement) of the digital camera 100. Based on an output signal from the gyro sensor 250, the digital camera 100 performs a blur correction and determination of stabilization.

The power switch (SW) 260 switches the power of the digital camera 100 to ON or OFF. When the power switch 260 is turned ON, the controller 180 can be activated to enable the main functions of the digital camera 100 such as image capturing and mage recording/reproduction. When the power switch is turned OFF, the controller 180 is not activated and the main functions of the digital camera 100 are disabled.

Figure 2:
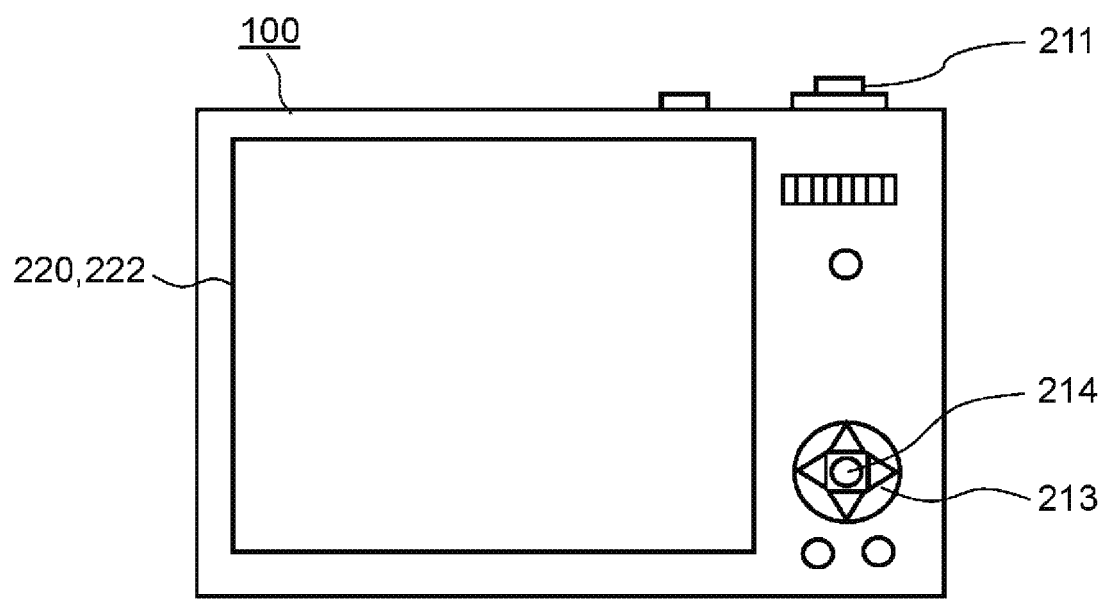
FIG. 2 is a rear side view of the digital camera according to Embodiment 1.

FIG. 2 shows a rear side of the digital camera 100. FIG. 2 shows an example of the operation member 210 which includes a release button 211, selection buttons 213, an enter button 214, and a touch panel 222. Upon receiving a user operation, the operation member 210 transmits order signals to the controller 180.

The release button 211 is a two-step push-down button. When the release button 211 is pressed halfway by a user, the controller 180 performs auto focus control (AF control), auto exposure control (AE control), or the like. When the release button 211 is fully pressed down by a user, an image data is captured at the timing of the button being pressed down and the controller 180 records the captured image data in the memory cards 201 and 202.

The selection buttons 213 are multiple push-down buttons disposed around the enter button 214 so as to be directed in the up, down, left, and right directions. A user can push down one of the up, down, left, and right directed selection buttons 213 to scroll down a view on the display monitor 220 or select condition items.

The enter button 214 is a push-down button. When the enter button 214 is pressed by a user while the digital camera 100 is in a shooting mode or an image reproduction mode, the controller 180 causes the display monitor 220 to display a menu screen. The menu screen is a screen for setting various conditions for shooting (recording) and image reproduction. When the enter button 214 is pressed down while any item for setting a condition is selected, the controller 180 determines the setting of the selected item.

The touch panel 222 is disposed over a screen of the display monitor 220, and detects a touch operation on the screen by a user's finger. With the touch operation, for example, a user can designate an area in the image displayed on the display monitor 220.

In the digital camera 100, when image data is to be copied between the memory card 201 loaded in the card slot 1 and the memory card 202 loaded in the card slot 2, the memory card as a copy source is dynamically switched according to a recent action of the digital camera 100. With the memory card as a copy source being switched, it is more likely that the memory card from which a user intends to copy data has been selected as a copy source. This spares a user the trouble of changing the copy direction of image data between the memory cards. Hereinafter, the operation of the digital camera 100 according to the present embodiment will be described in detail.

1-2. Operation 1-2-1. Overall Operation

Figure 3:
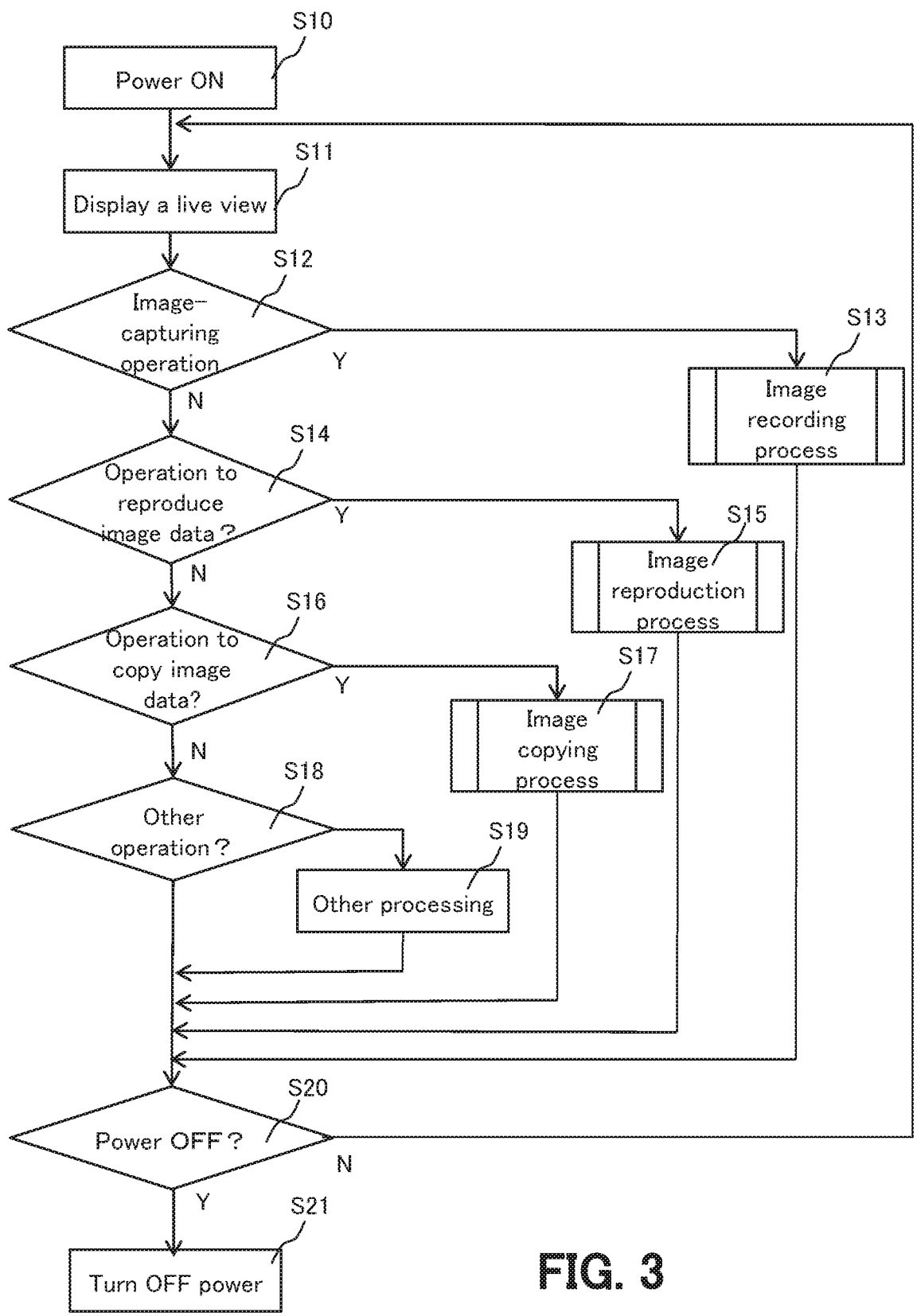
FIG. 3 is a flowchart showing an overall operation of the digital camera according to Embodiment 1.

FIG. 3 is a flowchart showing an overall operation of the digital camera 100 shown in FIG. 1, mainly showing the processing executed by the controller 180.

When the power switch 260 is turned ON (S10), a live view acquired via the CMOS 140 is displayed on the display monitor 220 (S11). When a user fully presses the release button 211 (FIG. 2) to capture a subject image (S12), the controller 180 performs image recording (S13) to record the image data in the memory cards 201 and 202. In the image recording, the current information table T2 (FIG. 12B) as will be described later is updated. The items to be updated differ depending on a recording mode and a copy destination set for recording image data. How the recording mode and the copy destination for recording image data is set will be described later.

When a user operates the operation member 210 or the touch panel 222 (FIG. 2) to reproduce image data recorded in the memory card 201 or 202 (S14), the controller 180 executes an image reproduction process as described later (S15). The current information table T2 (FIG. 12B) described later is then updated in the image reproduction process.

When a user operates the operation member 210 or the touch panel 222 (FIG. 2) to copy image data between the memory cards 201 and 202 (S16), the controller 180 executes an image copying process between the memory cards 201 and 202, as will be described later (S17).

When a user operates the operation member 210 or the touch panel 222 (FIG. 2) to select another operation (S18), the controller 180 executes another process according to the selected operation (S19).

Unless the power switch 260 is turned OFF (No in S20), steps S11 to S19 are executed. When the power switch 260 is turned OFF (Yes in S20), the power of the digital camera 100 is turned OFF (S21).

1-2-2. Recording Process

<Recording Mode Setting, Etc.>

In the image recording process in step S13 of FIG. 3, a double slot (DS) setting table T1 as shown in FIG. 12A is referred to.

As shown in FIG. 12A, the DS setting table T1 includes a recording mode for recording a captured image data and setting information for a recording destination. For the "image recording mode", for example, one of the "relay recording", "backup recording", and "sort recording" is set. The "relay recording" is a recording mode in which image data is recorded in one memory card (201 or 202), and when the one memory gets full, the image data is then recorded in the other memory card (202 or 201). The "backup recording" is a mode of recording image data in both the memory cards 201 and 202 simultaneously. The "sort recording" is a recording mode in which a recording destination slot, which is the memory card 201 or 202, is determined depending on a recording format of the image data (moving image, still image, etc.). The "recording destination slot" indicates which slot records image data first when the "relay recording" is set. In the illustrated example, the card slot 1 records the image data first. The "JPEG recording destination" and the "moving image recording destination" as shown in FIG. 12A indicate the recording destination slots corresponding to recording formats when the "sort recording" is set. In the illustrated example, if the image data are JPEG and RAW, the image data are recorded in a memory card in the card slot 1. When the image data are moving images, the image data are recorded in a memory card in the card slot 2. The "sort recording" can also set a recording destination slot according to a recording format with a high resolution such as 4K or 6K.

Figure 5:
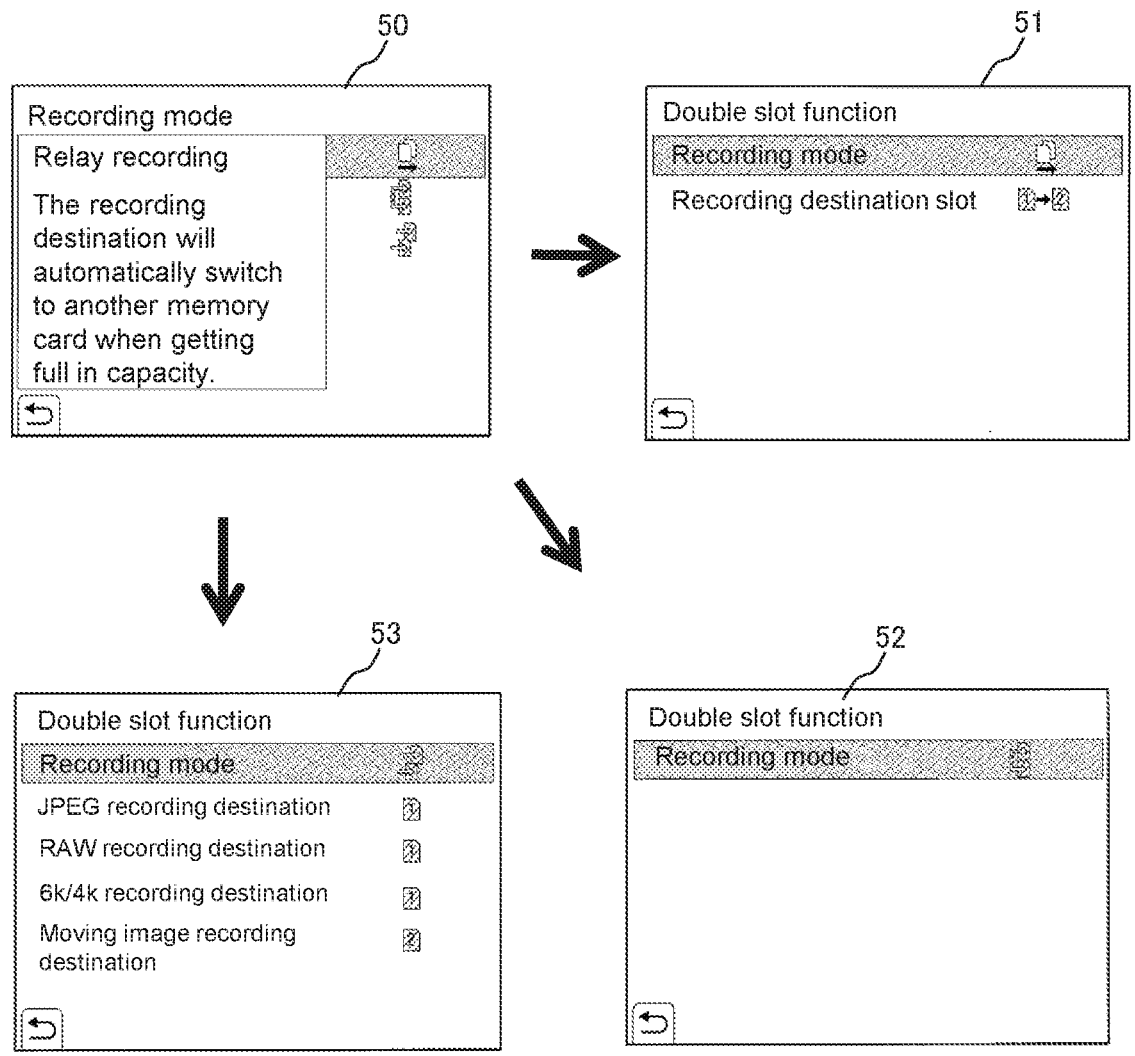
FIG. 5 shows screen transition in setting a recording mode or the like in the digital camera shown in FIG. 4.

The DS setting table T1 may be set or changed as follows. The controller 180 causes the display monitor 220 to display a recording mode setting screen 50 as shown in FIG. 5 in response to a user operation. The screen 50 displays the names of recording modes, i.e. "relay recording", "backup recording", and "sort recording", together with the corresponding icons. The screen 50 also displays text for explaining a highlighted recording mode. Seeing the recording mode setting screen 50, a user selects and sets one of the "relay recording", "backup recording", and "sort recording" by operating the operation member 210 or the touch panel 222. When the "relay recording" is selected, the controller 180 causes the screen of the display monitor 220 to change from the screen 50 to the screen 51 in FIG. 5. A user can change the recording destination slot through the screen 51. When the "backup recording" is selected, the controller 180 causes the screen of the display monitor 220 to change from the screen 50 to the screen 52 in FIG. 5. When the "sort recording" is selected, the controller 180 causes the screen of the display monitor 220 to change from the screen 50 to the screen 53 in FIG. 5. A user can set the recording destination slot according to a recording format of the image data through the screen 53.

<Recording Process>

Figure 4:
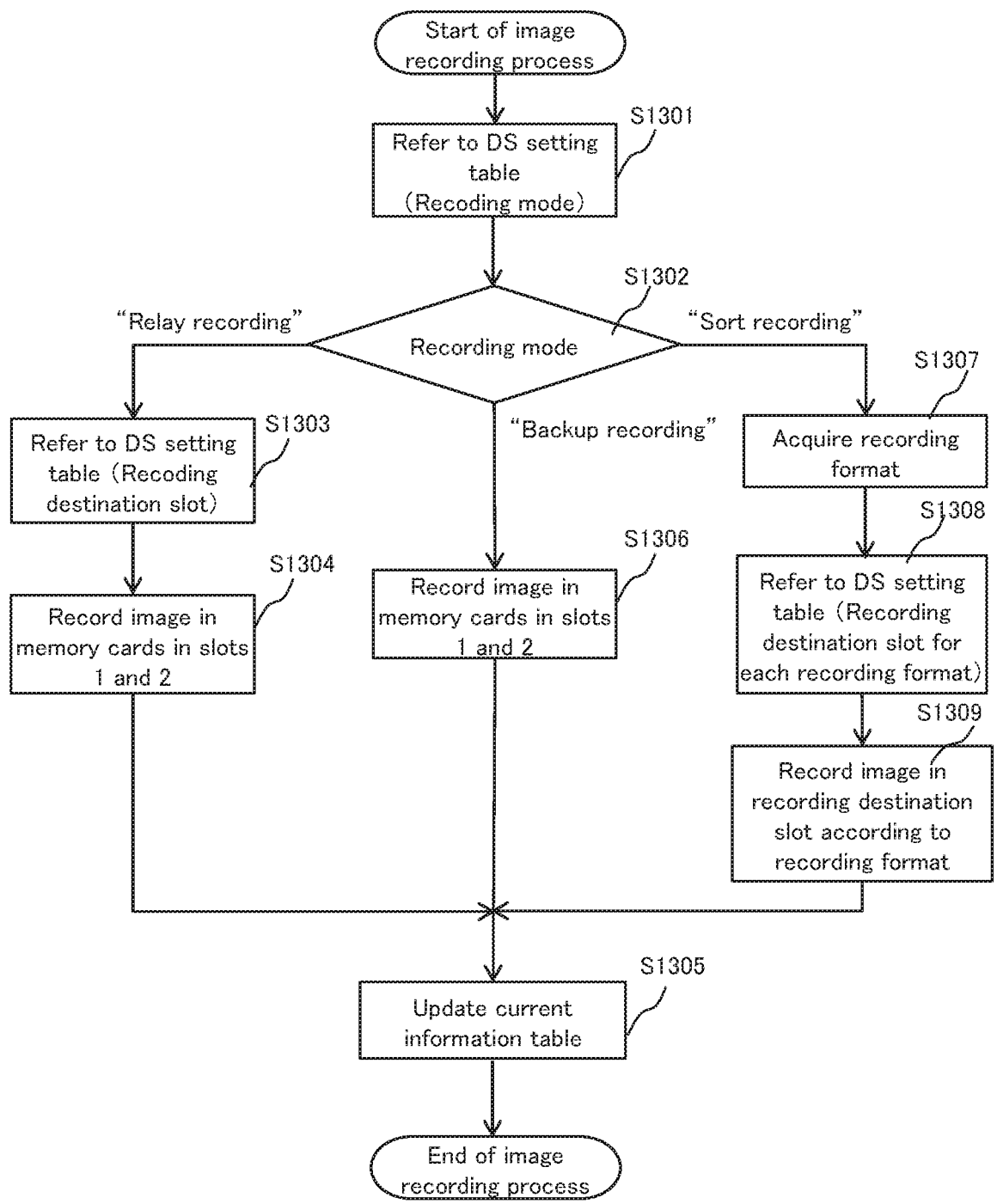
FIG. 4 is a flowchart showing a recording operation of the digital camera according to Embodiment 1.

FIG. 4 shows a flow of an image recording process. When an image capturing operation is performed in step S12 of FIG. 3, the controller 180 refers to the above-mentioned DS setting table T1 (FIG. 12A) and acquires the currently set "recording mode" (S1301). The controller 180 determines the acquired recording mode (S1302).

If the "relay recording" is set, the controller 180 refers to the "recording destination slot" in the DS setting table T1 (FIG. 12A) (S1303). Here, it is assumed that the currently set recording destination in the DS setting table T1 is slot 1→slot 2. According to this setting, the captured image data is recorded in the memory card 201 loaded in the slot 1 and then in the memory card 202 in the slot 2 in a sequential manner (S1304).

The controller 180 updates the current information table T2 (FIG. 12B) (S1305). The current information table T2 stores the last used slot number, folder number and file number. Here, if the image recording process ends when image data has been recorded in a memory card in the card slot 1, the "current slot number" is set to "1". If the image recording process ends when image data has been recorded in a memory card in the card slot 2, the "current slot number" is set to "2".

In step S1302, when the "backup recording" is set, the controller 180 records image data in the memory card 201 loaded in the card slot 1 and the memory card 202 loaded in the card slot 2 in parallel (S1306). The controller 180 updates the current information table T2 (FIG. 12B) (S1305). In this case, since the card slots 1 and 2 have been used simultaneously, the "current slot number" is not updated, and the "current folder number" and "current file number" which were newly produced and recorded image data last are recorded.

When the "sort recording" is set in step S1302, the controller 180 acquires a recording format of the image data (S1307). The controller 180 refers to the recording destination slot for each recording format in the DS setting table T1 (FIG. 12A) (S1308). The controller 180 records the image data in a memory card in the recording destination slot corresponding to the recording format (S1309). The controller 180 updates the current information table T2 (FIG. 12B) (S1305). In this mode, the card slot loaded with a memory card in which the image data was recorded last is set as the "current slot number", the folder number in which the image data was recorded last is set as the "current folder number", and the file number for the last recorded image data is set as the "current file number".

1-2-3. Image Reproduction Process

Figure 6:
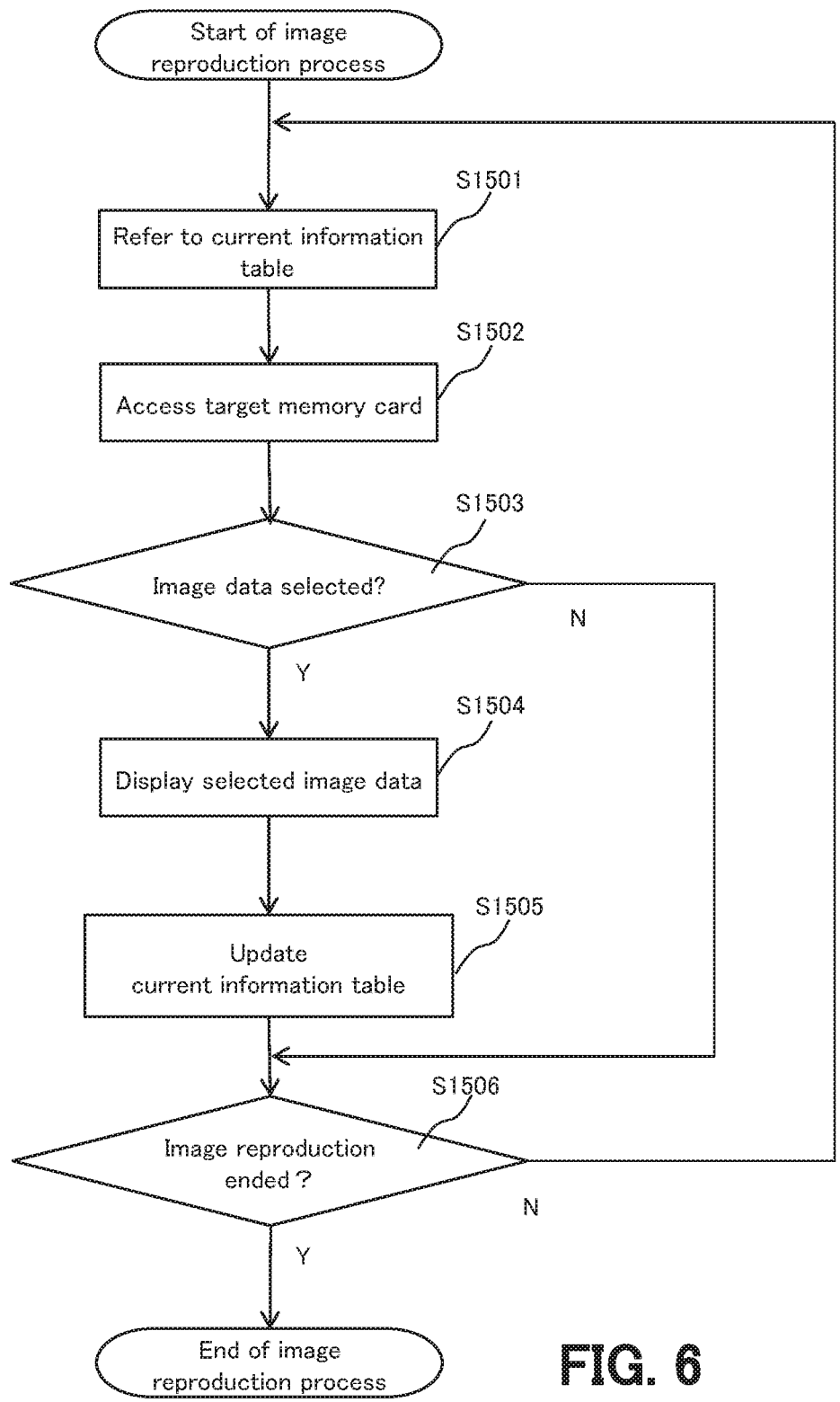
FIG. 6 is a flowchart showing an image reproduction operation of the digital camera according to Embodiment 1.

FIG. 6 shows a flow of the image reproduction process in step S15 of FIG. 3.

In response to an image reproduction operation in step S14 of FIG. 3, the controller 180 refers to the current information table T2 (FIG. 12B) and acquires the "current slot number", "current folder number", "current file number" (S1501). For example, it is assumed that the "current slot number" is "1", the "current folder number" is "101", and the "current file number" is "007" as shown in FIG. 12B.

The controller 180 accesses the memory card 201 loaded in the card slot 1 (S1502) and reads the image data of the file number "007" in the folder number "101".

When image data is selected by a user operation using the operation member 210 or the touch panel 222 (Yes in S1503), the controller 180 causes the display monitor 220 to sequentially display the selected image data (S1504). A user can select image data by pressing the selection buttons 213 (FIG. 2) to sequentially switch the images displayed on the display monitor 220, or may select image data from among the file names or thumbnail images displayed on the display monitor 220. The controller 180 updates the current information table T2 (FIG. 12B) according to the information of the image data displayed on the display monitor 220 (S1505). For example, if the displayed image data is the data of the file number 54 in the folder number 155 recorded in the memory card 202 (slot 2), the "current slot number" in the current information table T2 (FIG. 12B) is written as "2", the "current folder number" is written as "155", and the "current file number" is written as "054". The controller 180 repeats steps S1501 to S1505 unless the image reproduction process is ended (S1506). The image reproduction process is ended due to, for example, the power turned off or shift to another operation.

As described above, the current information table T2 is updated each time image data is recorded or read.

Specifically, in the above-mentioned current information table T2, the "current slot number" is the last used slot number, which is any of the following slot numbers.

Figure 7:
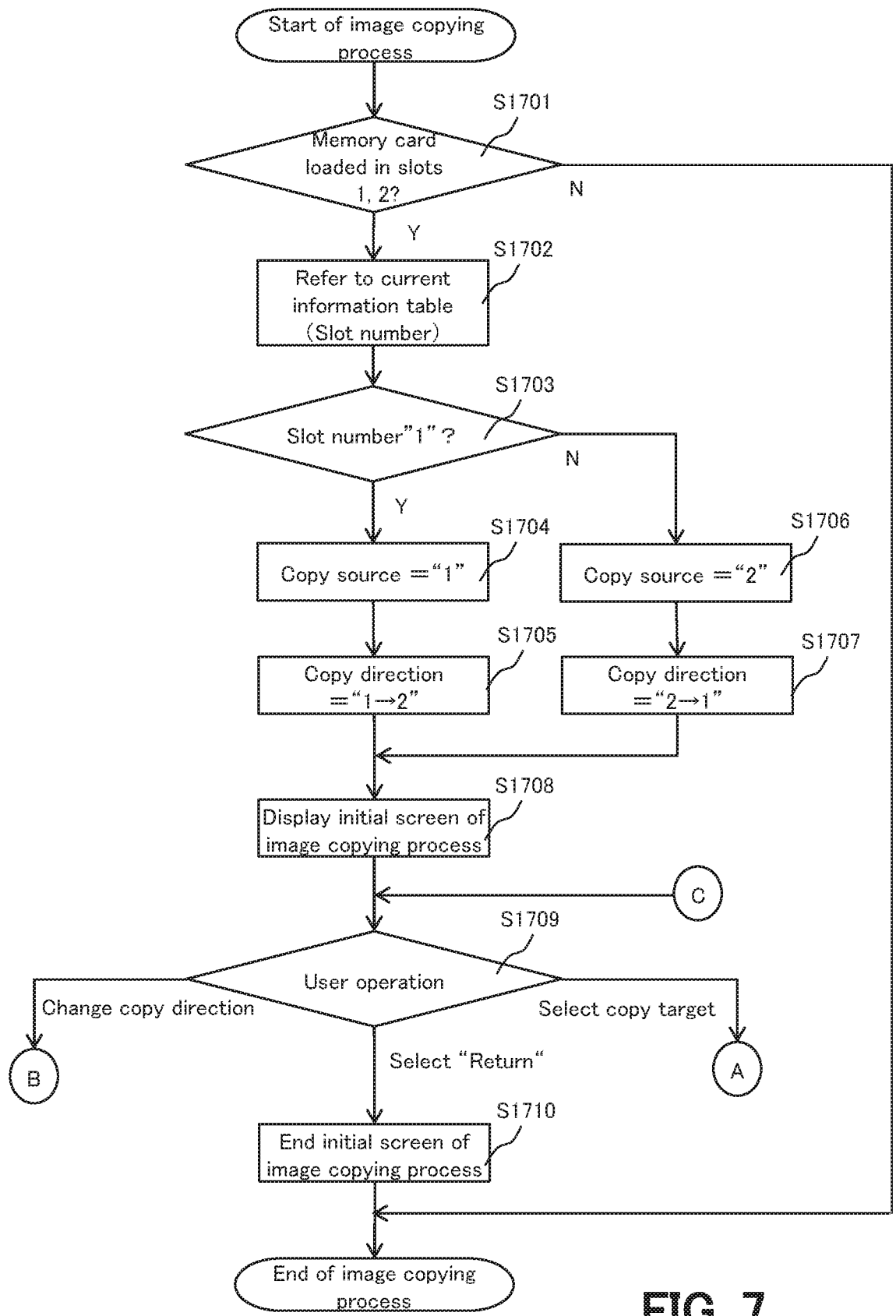
FIG. 7 is a flowchart showing an image copying operation of the digital camera according to Embodiment 1.
Figure 8:
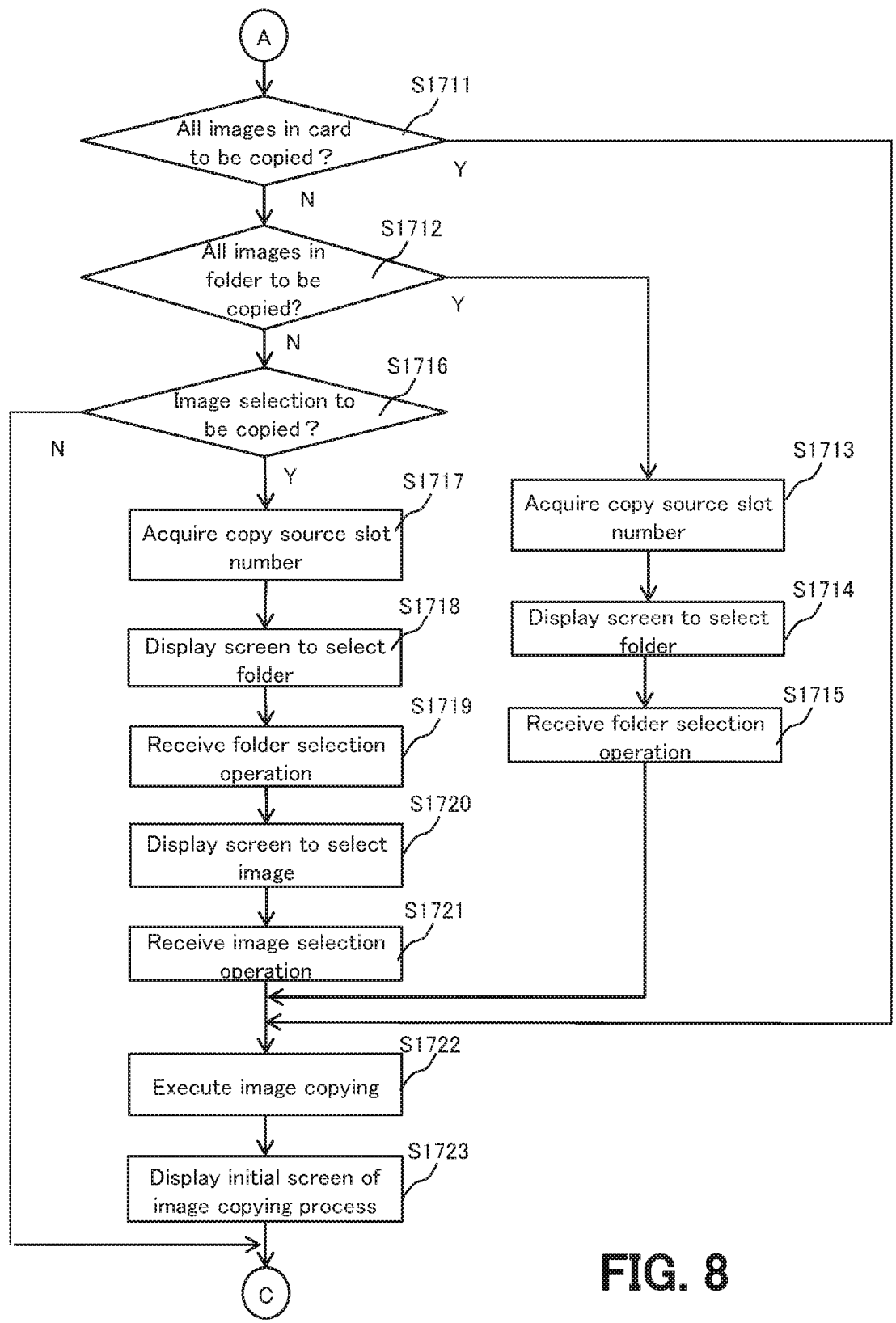
FIG. 8 is a flowchart following FIG. 7, showing the image copying operation of the digital camera.
Figure 9:
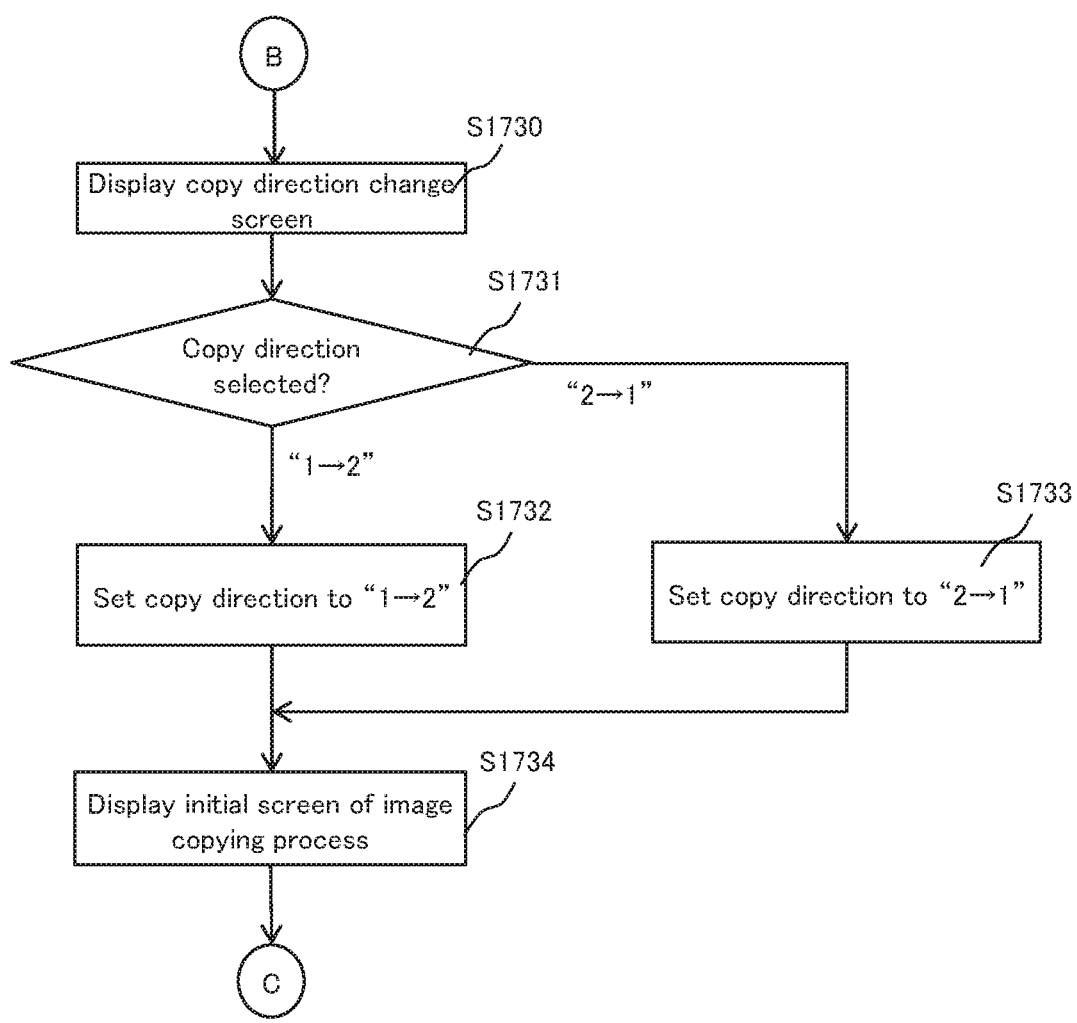
FIG. 9 is a flowchart following FIG. 7, showing the image copying operation of the digital camera.
Figure 10:
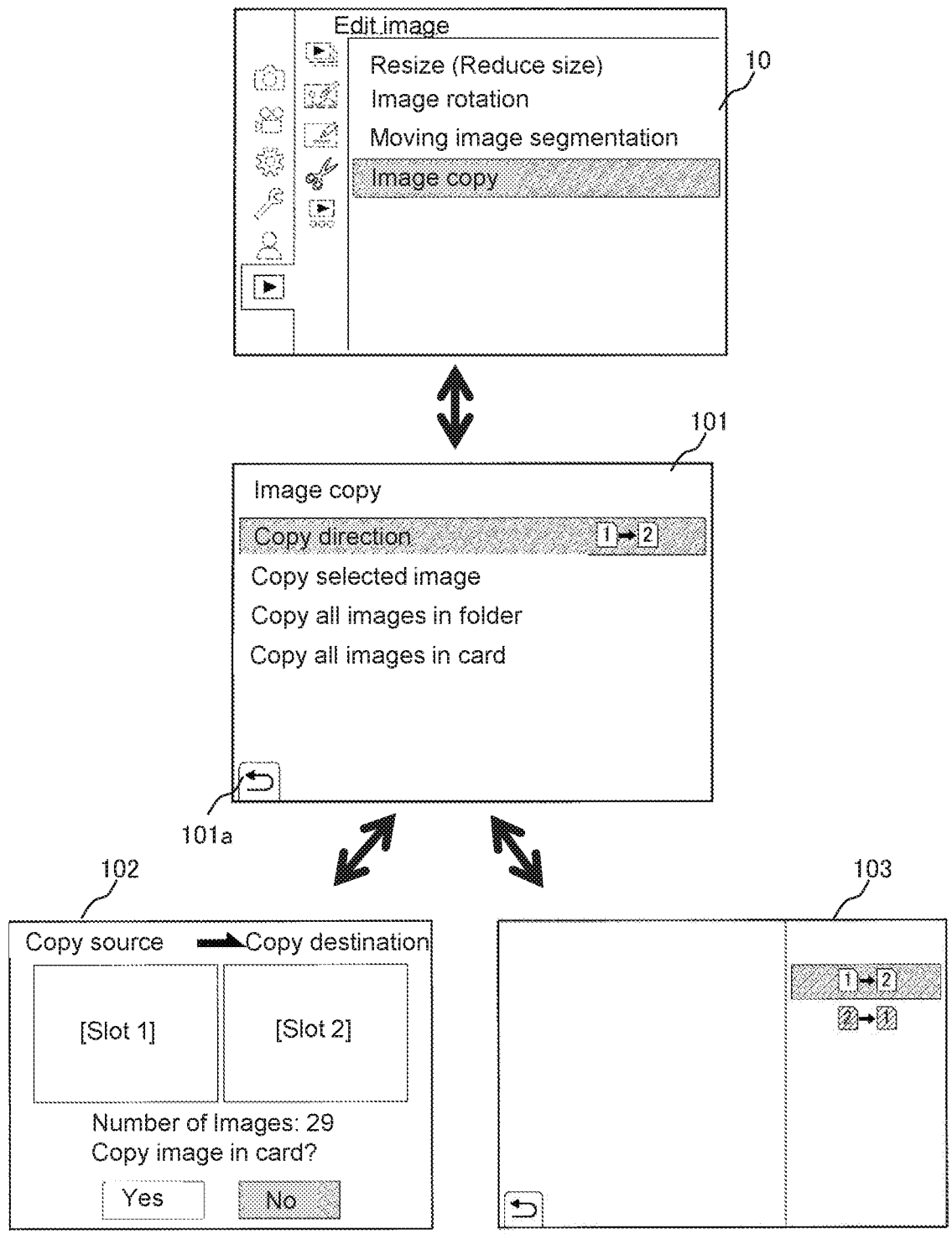
FIG. 10 shows screen transition in the image copying shown FIGS. 7 to 9.

(1) The last slot in which image data was recorded
(2) The last slot from which image data was read 1-2-4. Image Copying Process FIGS. 7 to 9 show a flow of the image copying process in step S17 of FIG. 3. The image copying process is started when the screen 10 shown in in FIG. 10 is displayed on the display monitor 220 and the "image copy" has been selected by a user operation.

In response to an user operation to copy image data in step S16 of FIG. 3, the controller 180 first determines whether or not a memory card is loaded in the card slot 1 or the card slot 2 (S1701).

If no memory card is loaded in either or both of the card slots, image copying between memory cards cannot be performed, and therefore, the image copying process ends. In this case, the controller 180 does not allow the display monitor 220 to execute screen transition from the screen 10 (FIG. 10) to the screen 101, which is an initial screen for the image copying process as will be described later, even when the "image copy" in the screen 10 is selected. The controller 180 can cause the display monitor 220 to display a warning that a memory card is not set.

If memory cards are loaded in both of the slots, the process proceeds to the next step.

The controller 180 refers to the "current slot number" in the current information table T2 (FIG. 12B) (S1702). If the "current slot number" is "1" (Yes in S1703), the controller 180 sets the copy source to "1" (S1704) and the copy direction to "1→2" (S1705). The set copy direction is stored in the internal memory 240. If the "current slot number" is "2" (No in S1703), the controller 180 sets the copy source to "2" (S1706) and the copy direction to "2→1" (S1707). The set copy direction is stored in the internal memory 240. In the following description, it is assumed that the copy direction is set to be "1→2".

The controller 180 causes the display monitor 220 to execute screen transition from the screen 10 to the screen 101 as shown in FIG. 10 (S1708). The screen 101 is an initial screen of the image copying process, with which a user can select a copy target and a copy direction (S1709). When a user selects the return button 101a on the screen 101 of FIG.

10, the controller 180 causes the display monitor 220 to change the screen 101 to the screen 10 to end the image copying initial screen (S1710).

The copy target can be selected from among "copy all images in card", "copy all images in folder", and "copy selected image". If "copy all images in card" is selected in step S1711 shown in FIG. 8, the controller 180 causes the screen of the display monitor 220 to change to the screen 102 shown in FIG. 10. When a user selects "Yes" on the screen 102, the controller 180 copies all image data of the memory card 201 loaded in the copy source card slot 1 to the memory card 202 in the copy destination card slot 2 (S1722).

Figure 11:
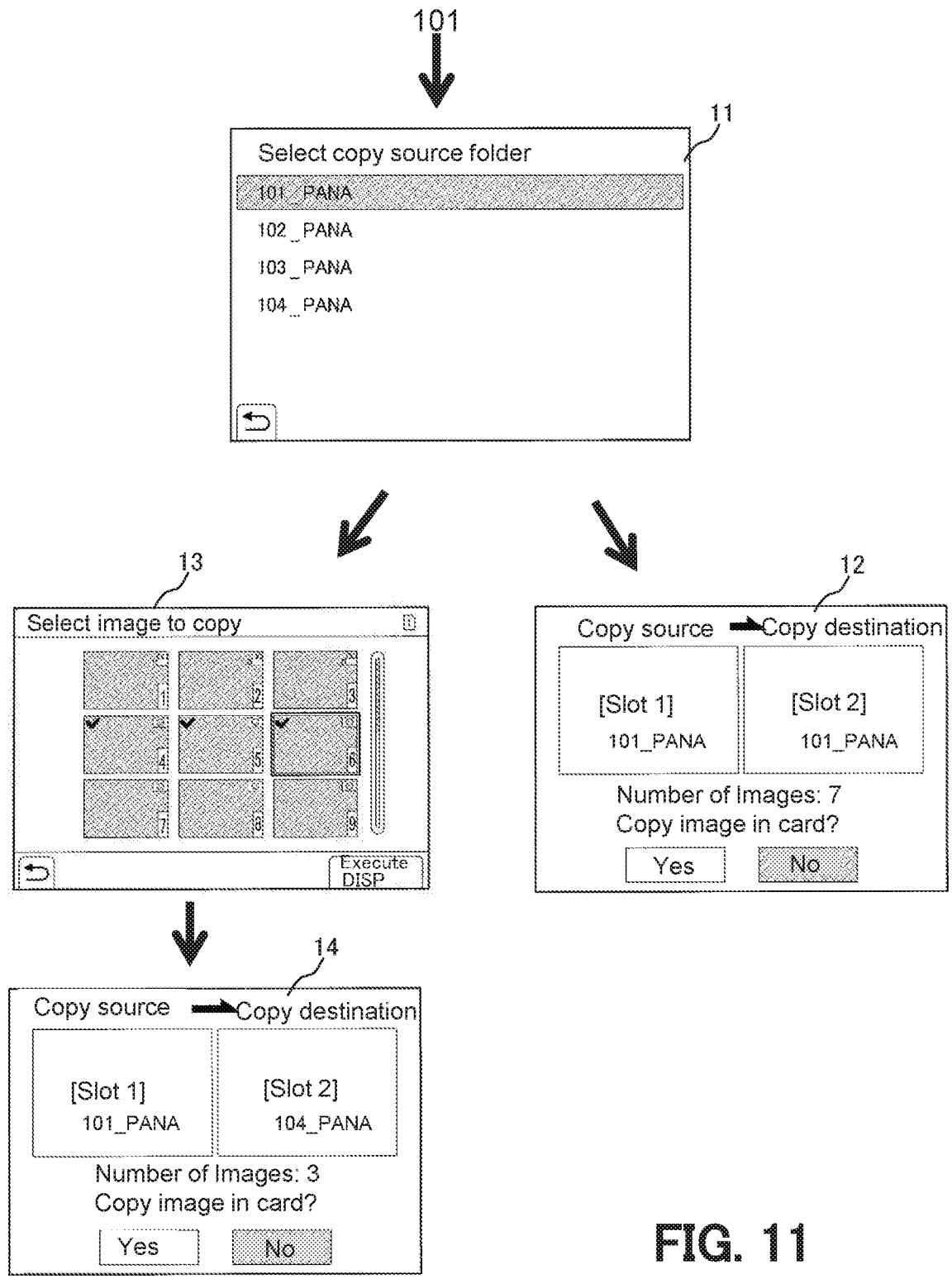
FIG. 11 shows screen transition in the image copying shown FIGS. 7 to 9.

When "copy all images in folder" is selected in step S1712, the controller 180 acquires the copy source slot number "1" stored in steps S1703 to S1707 of FIG. 7 (S1713), and accesses the memory card 201 loaded in the card slot 1. At this time, the controller 180 causes the screen of the display monitor 220 to change from the screen 101 (FIG. 10) to the screen 11 (FIG. 11). The screen 11 displays folder names stored in the memory card 201 loaded in the copy source card slot 1 (S1714). The controller 180 receives a user operation to select a folder on the screen 11 (S1715). Next, the controller 180 causes the screen of the display monitor 220 to change to the screen 12 (FIG. 11). When a user selects "Yes" on the screen 12, the controller 180 copies the folder ("101_PANA" in the illustrated example) in the memory card 201 in the card slot 1 which is the copy source to the memory card 202 in the card slot 2 (S1722).

When "copy selected image" is selected in step S1716, the controller 180 acquires the copy source slot number "1" stored in steps S1703 to S1707 of FIG. 7 (S1717), and accesses the memory card 201 loaded in the card slot 1. At this time, the controller 180 causes the screen of the display monitor 220 to change from the screen 101 (FIG. 10) to the screen 11 (FIG. 11). The screen 11 displays folder names stored in the memory card 201 loaded in the copy source slot 1 (S1718). The controller 180 receives a user operation to select a folder on the screen 11 (S1719). Next, the controller 180 causes the screen of the display monitor 220 to change from the screen 11 to the screen 13 (FIG. 11), where an image selection screen including thumbnails of the image data in the selected folder is displayed (S1720). The controller 180 receives a user operation to select image data on the screen 13 (S1721). Next, the controller 180 causes the screen of the display monitor 220 to change to the screen 14 (FIG. 11). If a user selects "Yes" on the screen 14, the controller 180 copies the selected image data in the folder ("101_PANA" in the illustrated example) selected from the memory card 201 loaded in the copy source card slot 1 to the memory card 202 loaded in the card slot 2 (S1722). After performing the image copying, the controller 180 causes the screen of the display monitor 220 to return to the screen 101 (FIG. 10) which is the initial screen for the image copying process (S1723), and returns to step S1709 of FIG. 7.

In the case of copying selected image data in step S1716 of FIG. 8, if the selected image data is the data captured by continuous shooting, the series of image data may be grouped and only a representative image data may be reproduced. In such a case where the image data includes image data captured by continuous shooting, the image copying process in this embodiment is performed such that target image data can be selected from all image data in the copy source slot.

Next, a case where the copy direction is changed through a user operation in step S1709 of FIG. 7 will be described with reference to FIG. 9. The controller 180 causes the screen 101 of FIG. 10 to change to the screen 103 to display a copy direction change screen (S1730). A user selects the copy direction through the screen 103 (S1731). When a user selects the copy direction "1→2", the controller 180 sets the copy direction to "1→2" and stores it in the internal memory 240 (S1732). Similarly, when a user selects the copy direction "2→1", the controller 180 sets the copy direction to "2→1" and stores it in the internal memory 240 (S1733). After setting the copy direction, the controller 180 causes the screen of the display monitor 220 to return to the screen 101 (FIG. 10) which is the initial screen for the image copying process (S1734), and returns to step S1709 of FIG. 7.

The copy direction set by the processing shown in FIG. 9 may be stored in the internal memory 240 while the image copying process is ongoing. This allows the copy direction that a user is likely to use next to be set and kept, even when the user needs to repeatedly perform the image copying process. As a result, a user does not need to set the copy direction frequently. The copy direction set in the image copying process can be discarded after the image copying process is completed, and may be set to a default copy direction (for example, 2→1) when a next image copying process starts. Alternatively, the copy direction set in the image copying process may be kept in the internal memory 240 and used in a next image copying process.

1-3. Effects

In the digital camera 100 according to Embodiment 1, the controller 180 copies image data between the memory cards 201 and 202 loaded in the card slots 1 and 2 respectively. The controller 180 stores target medium information in the internal memory 240. The target medium information is for example, a current slot number for indicating a memory card among the memory cards 201 and 202, in which image data is recorded last or from which image data is read last. The controller 180 sets a copy source and a copy destination for image data from among the memory cards 201 and 202 based on the target medium information, and causes the display monitor 220 to output information indicating the copy direction.

In the digital camera 100, the copy direction between the memory cards 201 and 202 can be set to be the copy direction that is likely to be used. Accordingly, the copy direction is dynamically set such that the copy source is a memory card in a card slot in which image data is recorded last or a memory card in a card slot from which image data is read last. Therefore, when image data is copied between the memory cards 201 and 202, it is highly likely that a memory card from which a user intends to copy the image data is already selected as a copy source. This can reduce the trouble of a user to change the copy direction.

2. Other Embodiments

Embodiments were described above as examples of the technology disclosed in the present application. However, the present disclosure is not limited to these techniques, and can also be applied to embodiments in which changes, replacements, additions, omissions, and the like are appropriately made. The constituent elements described in the above embodiments can also be combined to yield a new embodiment.

(1) In the image copying process as shown in FIG. 7, the controller 180 can determine whether image data is recorded in the memory cards 201 and 202 loaded in the card slots 1 and 2 respectively before setting the copy direction (S1702 to S1707). When image data is not recorded in either one of the memory cards 201 and 202, the controller 180 can set the copy direction to be from the memory card in the card slot in which image data is recorded to the memory card in the card slot in which no image data is recorded.

(2) The digital camera 100 can have three or more card slots. For example, with three card slots (slots 1, 2, 3), the copy direction is selected from among "1→2", "2→4", "1→3", "3→4", "2→3", and "3→2".

(3) The image copying process is not limited to being applied to copying between memory cards. The image copying process according to the above embodiments can be applied to copying between a memory card and an internal memory. Further, it can be also applied to copying between a recording medium loaded or built in the digital camera 100 and a recording medium such as a magnetic recording medium, an optical recording medium, or a flash memory connected to the digital camera 100 by wire or wirelessly.

(4) In the above embodiments, the copy direction for image data is set by the processing in S1702 to S1707 of FIG. 7 or by change of the copy direction as shown in FIG. 9. The currently set copy direction is shown on the screen 101 of the display monitor 220 as shown in FIG. 10, but this is not the only option. Instead of or in addition to the set copy direction being shown on the screen of the display monitor 220, the controller 180 may output a voice for guiding the currently set copy direction. In this case, the controller 180 can cause a speaker (not shown) to output a voice guide which is stored in a memory in advance. The voice guide can be output when the image copying initial screen is displayed (S1708 in FIG. 7). With the voice output, a user can acquire the currently set copy direction in advance before the image copying process is performed (S1711 to S1722 in FIG. 8), as in the case of the above-mentioned Embodiment 1. Therefore, a user can change the copy direction when necessary as shown in S1731 to S1734 in FIG. 9.

The controller 180 can execute image copying not only through a user operation in accordance with information displayed on the display monitor 220, but also through a voice input/output. In this case, the controller 180 can execute image copying by causing a speaker (not shown) to output an operation procedure by voice and receiving a voice order input from a user through a microphone (not shown).

(5) The above embodiments is applied to a lens-integrated type digital camera as an example of an imaging device but can be also applied to an interchangeable lens type camera. The imaging device may be another electronic device having an imaging function such as a smartphone or another mobile terminal.

(6) The sequence of processes in the controller flow in the above embodiments is not necessarily limited to what was described in the above embodiments. The sequence can be changed, or some of the processes can be executed in parallel or simultaneously.

(7) Understandably, the above embodiments can be applied to transferring of image data between multiple recording media loaded in or connected to an imaging device. In this case, the controller 180 can set a transfer direction based on the target medium information as exemplified by the "current slot number" in the current information table T2 (FIG. 12B). The transfer direction indicates, among the multiple recording media, a transfer source recording medium and a transfer destination recording medium for transferring the image data, similarly to the copy source recording medium and the copy destination recording medium in the above embodiments.

(8) Understandably, the above embodiments can be applied to a case where image data in the multiple recording media are to be edited or deleted. In this case, when the image data in any one of the multiple recording media is to be edited, the controller 180 can set a recording medium for editing image data based on the target medium information, e.g. the current slot number, from among the multiple recording media. Similarly, when the image data in any one of the multiple recording media is to be deleted, the controller 180 can set a recording medium for deleting the image data based on the target medium information, from among the multiple recording media. This can reduce the trouble of a user to frequently switch between the multiple recording media for editing or deleting image data.

(9) The embodiments have been described above as an example of the technique according to the present disclosure. The accompanying drawings and detailed description are provided for that purpose. Therefore, the constituent elements described in the accompanying drawings and the detailed description can include not only those essential for solving the problem but also can include those not essential for solving the problem in order to exemplify the above technique.

The present disclosure can be applied to an electronic device having an imaging function, such as a digital camera, movie camera, or camera-equipped mobile phone.

What is claimed is:

1. An imaging device comprising:
   an imaging sensor configured to capture an image of a subject to generate image data;
   a medium connector connectable to multiple recording media for recording the image data;
   a display configured to display an image based on the image data;
   a controller configured to execute at least one of copying and transferring of the image data between the multiple recording media; and
   a memory,
   wherein the controller is configured to:
   store target medium information in the memory, the target medium information indicating, among the multiple recording media, a recording medium in which the image data is recorded last or a recording medium from which the image data is read last; and
   set a copy direction based on the target medium information, the copy direction indicating, among the multiple recording media, a copy source recording medium and a copy destination recording medium for copying the image data, or
   set a transfer direction based on the target medium information, the transfer direction indicating, among the multiple recording media, a transfer source recording medium and a transfer destination recording medium for transferring the image data.

2. The imaging device according to claim 1, wherein the controller causes the display to output information indicating the set copy direction or the set transfer direction.

3. The imaging device according to claim 1, wherein the multiple recording media include a first recording medium and a second recording medium, and
   the controller is configured to:
   set the copy direction or the transfer direction to be from the first recording medium to the second recording medium when the target medium information indicates the first recording medium; and set the copy direction or the transfer direction to be from the second recording medium to the first recording medium when the target medium information indicates the second recording medium.

4. The imaging device according to claim 1, wherein the multiple recording media include a first recording medium and a second recording medium,
the controller is configured to determine whether the image data are recorded in the first recording medium and the second recording medium, and
when no image data is recorded in one of the first and second recording media, the controller is configured to set the copy direction or the transfer direction to be from the other of the first and second recording media to the one of the first and second recording media.

5. The imaging device according to claim 1, further comprising an operation unit configured to receive a first input for requiring the copying or transferring of the image data by a user operation,
wherein the controller is configured to set information indicating the copy direction or the transfer direction according to the first input, the controller configured to execute the copying or transferring of the image data according to the copy direction or the transfer direction.

6. The imaging device according to claim 5, wherein the operation unit is configured to receive a second input for requiring a change of the copy direction or the transfer direction by a user operation, and
the controller is configured to change the copy direction or the transfer direction in response to the second input, the controller configured to execute the copying or transferring of the image data according to the changed copy direction or the changed transfer direction.

7. The imaging device according to claim 1, wherein the multiple recording media include a first memory device and a second memory device,
the medium connector includes a first medium connector to which the first memory device can be connected and a second medium connector to which the second memory device can be connected.

8. The imaging device according to claim 7, further comprising an operation unit configured to receive a first input for requiring the copying or transferring of the image data by a user operation,
wherein the controller is configured not to copy or transfer the image data regardless of the first input received, when either one of the first memory device or the second memory device is not connected.

9. The imaging device comprising:
an imaging sensor configured to capture an image of a subject to generate image data;
a medium connector connectable to multiple recording media for recording the image data;
a display configured to display an image based on the image data;
a controller configured to execute at least one of editing and deleting image data between the multiple recording media; and
a memory,
wherein the controller is configured to:
store target medium information in the memory, the target medium information indicating, among the multiple recording media, a recording medium in which the image data is recorded last or a recording medium from which the image data is read last; and
set a recording medium for editing the image data based on the target medium information, from among the multiple recording media, or
set a recording medium for deleting the image data based on the target medium information, from among the multiple recording media.

* * * * *